May 21, 1963
C. H. MUEHLHAUSEN
3,090,509
WAGON GUIDE ARM FOR BALE THROWER
AND ADJUSTING MEANS THEREFOR
Filed March 19, 1962
2 Sheets-Sheet 1
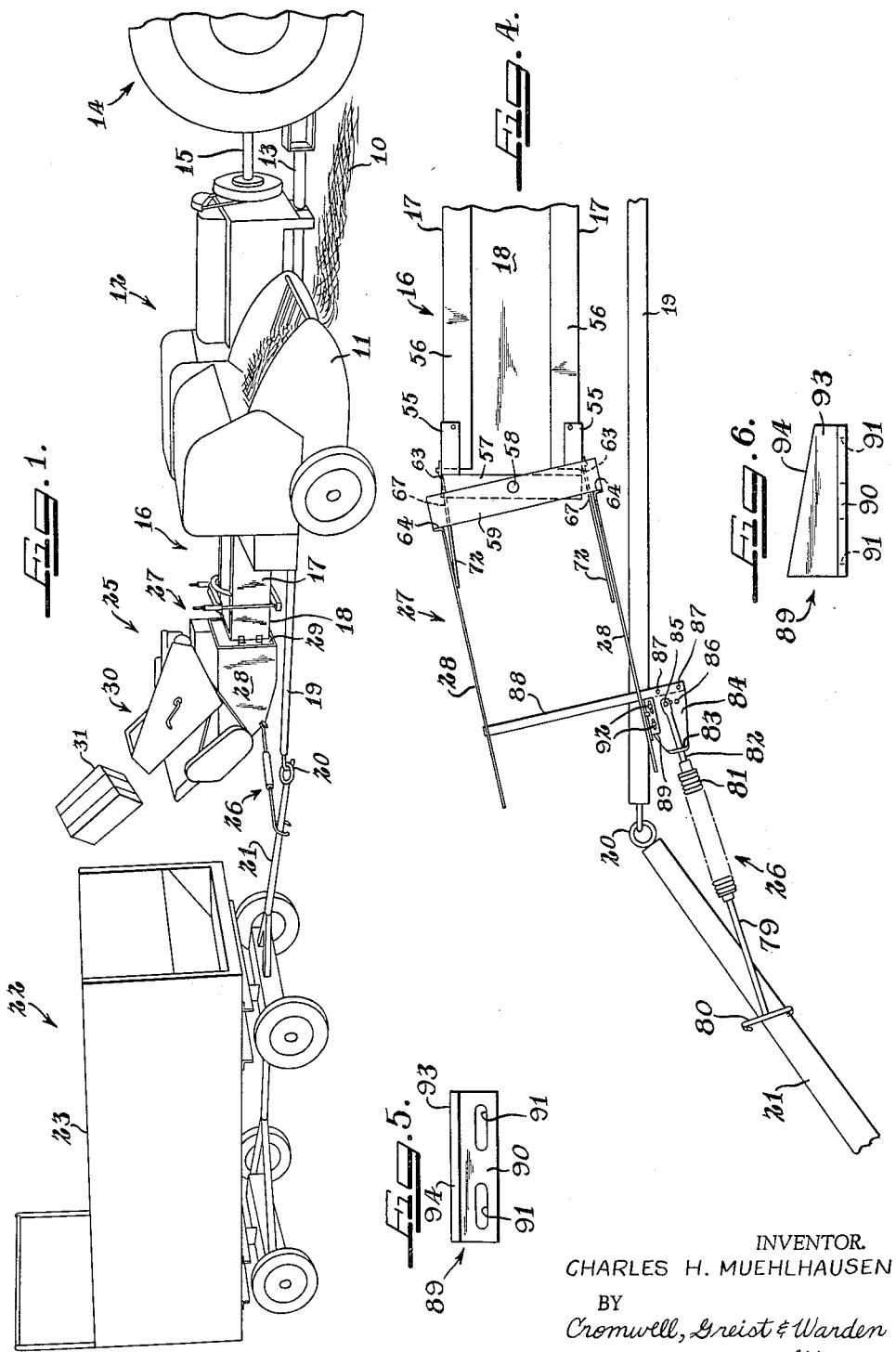
INVENTOR.
CHARLES H. MUEHLHAUSEN
BY
Cromwell, Greist & Warden
Attys.

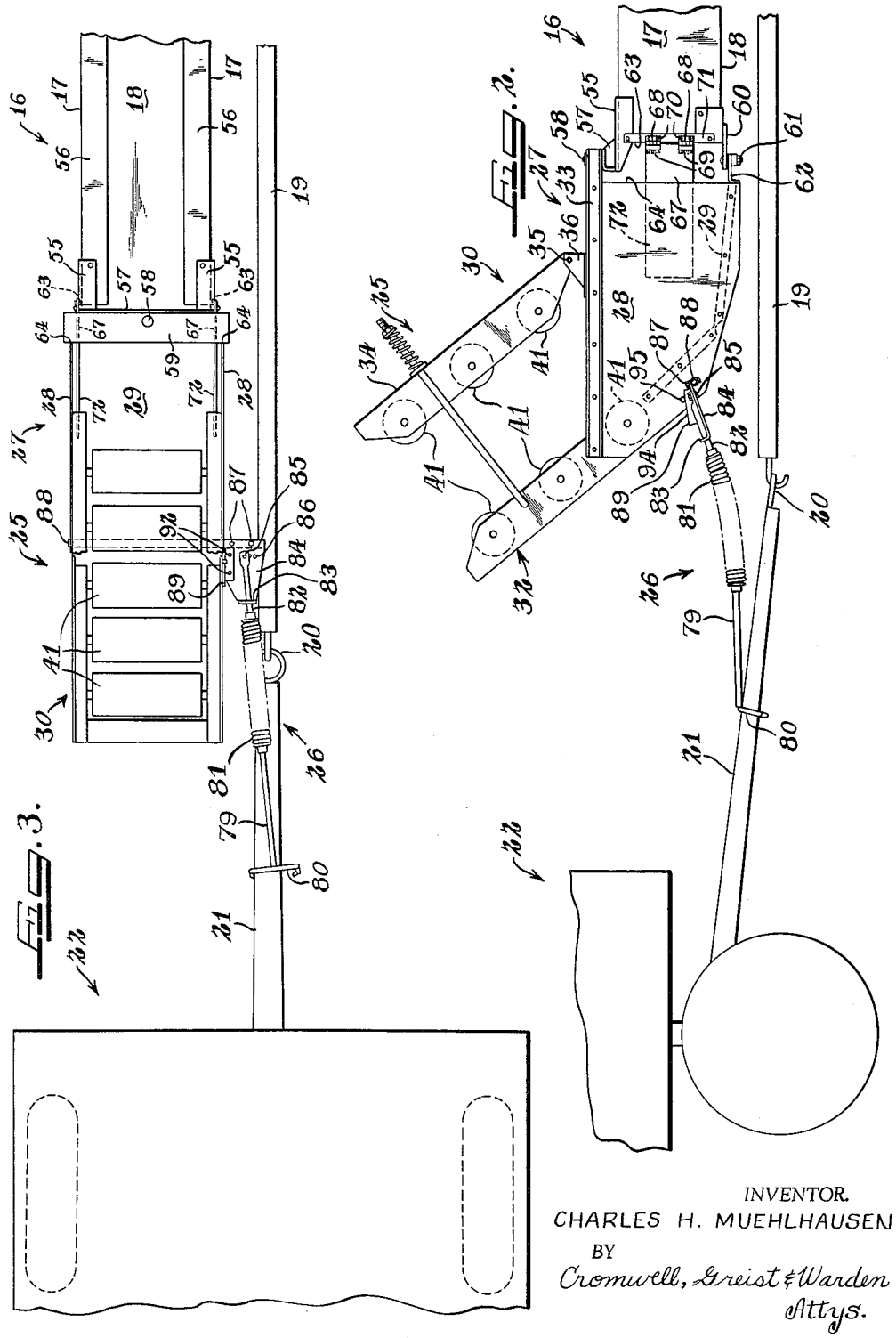

United States Patent Office 3,090,509
Patented May 21, 1963

3,090,509
WAGON GUIDE ARM FOR BALE THROWER AND ADJUSTING MEANS THEREFOR
Charles H. Muehlhausen, Shelbyville, Ill., assignor to Oliver Corporation, Chicago, Ill., a corporation of Delaware
Filed Mar. 19, 1962, Ser. No. 180,731
4 Claims. (Cl. 214—42)

This invention relates, generally, to devices for baling hay and the like and it has particular relation to means for adjusting the force exerted by a wagon guide arm on the tongue of the wagon following the baler. The present invention is employed in conjunction with certain of the apparatus disclosed in application Serial No. 180,732 filed March 19, 1962.

The position of a bale thrower with respect to a baler on which it is pivotally mounted is controlled by a wagon guide arm interconnecting the bale thrower and the tongue of a following bale receiving wagon having an articulate connection to the baler. A spring is interposed in the wagon guide arm to maintain its connection to the tongue particularly under those conditions where the terrain is such that the connection might be disengaged as when the baler and wagon travel over uneven ground.

Among the objects of this invention are: To provide for adjusting the force applied by the spring in a wagon guide arm to the tongue of a following wagon in order to accommodate different terrain conditions; to mount the adjusting means on the bale thrower in a position that is readily accessible to the operator for change; and to employ for this purpose an angular bracket having an inclined upper surface that is movable with respect to a stop on the bale thrower for adjusting the angular position of the forward end of the wagon guide arm with respect to the bale thrower and thereby the tension of the spring.

In the drawings:

FIG. 1 is a perspective view of the portion of the tractor hauling a hay baler provided with a pivotally mounted bale thrower arranged to discharge bales of hay into a following wagon.

FIG. 2 is a view, in side elevation, of a portion of the hay baler and showing the bale thrower pivotally mounted thereon, the bale thrower having the drive means for the drive rolls omitted, and also showing a front end portion of the following wagon having an articulate connection to the baler.

FIG. 3 is a top plan view of the construction shown in FIG. 2.

FIG. 4 is a view, somewhat diagrammatic in character, showing the relative positions of the several parts when the tongue of the following wagon is inclined with respect to the direction of forward movement of the baler and the tractor and showing how the bale thrower is pivoted on the bale chamber and swung to a position such that the bale thrown thereby will land in the body of the following wagon.

FIG. 5 is a top plan view of an angular adjusting bracket that is mounted on the bale thrower for adjusting the position of the forward end of the wagon guide arm.

FIG. 6 is a view in side elevation of the angular adjusting bracket shown in FIG. 5.

Referring now particularly to FIG. 1 of the drawings, it will be observed that the reference character 10 designates a windrow of mown hay that is arranged to be picked up by a catcher 11 of a hay baler, shown generally at 12, which is arranged to be drawn by a draw bar 13 extending from a tractor a portion of which is indicated, generally, at 14. A power take-off 15 interconnects the tractor 14 and the hay baler 12 for the purpose of operating the latter in known manner. While the present invention is described particularly for baling hay, it will be understood that it can be employed for baling other like material such as straw.

The construction of the hay baler 12 is conventional and it includes a rearwardly extending bale chamber, indicated generally at 16, which is defined by vertical side walls one of which is shown at 17 and a bottom wall 18. It will be understood that the hay is compressed by the hay baler 12 into a bale that may have a generally square cross section and is substantially longer than it is wide.

It is desirable to provide for automatically picking up the bales of hay after they are discharged from the bale chamber 16. For this purpose a wagon hitch tube 19 extends rearwardly from the hay baler 12 and is detachably connected at 20 to the forward end of a tongue 21 that extends from a wagon, shown generally at 22, having a relatively large body 23 for receiving the bales of hay.

In order to transport the bales of hay from the bale chamber 16 as they are formed by the hay baler 12, a bale thrower, shown generally at 25, is pivotally mounted to rotate about a vertical axis on the rear end of the bale chamber 16. A wagon guide arm 26 is secured to the lower rear portion of the bale thrower 25 in a manner to be described in detail hereinafter and it has a sliding connection with the tongue 21 of the wagon 22 for the purpose of swinging the bale thrower 25 on its pivotal mounting on the bale chamber 16 so that it will be aligned with the body 23 of the wagon 22 at all times.

The bale thrower 25 is provided with a bale receiving chamber that is indicated, generally, at 27. It is formed by vertical side walls one of which is indicated at 28 the forward edges of which are spaced rearwardly and outwardly from the rear edges of the vertical side walls 17 of the bale chamber 16. The bale receiving chamber 27 also is formed by a bottom wall 29 which is located at substantially the same elevation as the bottom wall 18 of the bale chamber 16, it being positioned slightly below it in order to facilitate receipt of the tied bale from the bale chamber 16 by the bale receiving chamber 27. As pointed out, the vertical side walls 28 of the bale receiving chamber 27 are spaced outwardly from the vertical side walls 17 of the bale chamber 16. Also the bottom wall 29 is correspondingly wider than the width of the bottom wall 18 of the bale chamber 16. The reason for this construction is to permit the bale thrower 25 and its bale receiving chamber 27 to be positioned angularly with respect to the bale chamber 16 for the purpose of receiving tied bales when the wagon 22 and the bale thrower 25 are angularly positioned with respect to the direction of forward travel of the hay baler 12 and tractor 14.

Extending upwardly and rearwardly from the bale receiving chamber 27 is a bale throwing mechanism that is indicated, generally, at 30. It will be understood that the bale throwing mechanism 30 is arranged to accelerate a tied bale 31 rearwardly and upwardly with a sufficient force to throw it into the body 23 of the wagon 22. Thus it is unnecessary to employ more than a single operator who operates the tractor 14 for gathering hay from the windrow 10, baling it and loading the tied bales in a wagon for transport to a suitable storage area.

Some of the details of construction of the bale thrower 25 are shown in FIG. 2. Here it will be observed that the bale throwing mechanism 30 includes a lower frame member, shown generally at 32, and rigidly mounted on horizontally extending channel frame members one of which is indicated at 33 and which extend along the upper sides of the vertical side walls 28. The lower frame member 32 is inclined upwardly and overlying it is a similarly inclined upper frame member that is shown, generally, at 34. The upper frame member 34 is pivoted at 35 on plates, one of which is shown at 36, that are secured to the upper flanges of the channel frame members 33. It will be understood that the tied bale is moved from the bale chamber 16 into the bale receiving chamber 27. Then it is picked up by drive rolls 41 three of which are rotatably mounted on the lower frame member 32 with another three drive rolls 41 being rotatably mounted on the upper frame member 34. Each of the drive rolls 41 is mounted on a shaft 42 and the several shafts 42 are suitably journaled in the frame members 32 and 34. As described in the application above referred to, provision is made for rotating the drive rolls 41 so that they pick up a tied bale from the bale receiving chamber 27 as it moves into engagement with the lowermost pair of drive rolls 41—41 on the lower and upper frame members 32 and 34 by the next bale being forced through the bale chamber 16. The direction of rotation of the drive rolls 41 is such that the tied bale is moved upwardly therethrough with the upper and lower sides being gripped by the drive rolls to the end that the velocity of the bale is increased to such an extent that it is thrown, as shown in FIG. 1, at 31, from the bale throwing mechanism 30 into the body 23 of the wagon 22.

As shown in FIG. 2 angle shaped brackets 55—55 are secured to the upper sides of the vertical side walls 17—17 with their upper flanges overlying inturned flanges 56—56 along the upper edges of the side walls 17—17 as shown more clearly in FIGS. 3 and 4. Extending transversely between the angle shaped brackets 55—55 is a transverse angle bracket 57 from which a pivot pin 58 extends upwardly to provide a part of the pivot mounting for the bale thrower 25. The pivot pin 58 is journaled in a transverse end member 59 which extends between the channel frame members 33—33 which are not shown in FIGS. 3 and 4 since these figures, as above pointed out, are somewhat diagrammatic in character. Another part of the pivot mounting for the bale thrower 25 on the rear end of the bale chamber 16 is provided by a plate 60 which underlies the rear portion of the bottom wall 18 and it has a bolt 61 extending downwardly therethrough and through the forward end of a clip 62 which extends from the forward edge of the bottom wall 29 of the bale receiving chamber 27.

It will be observed that the rear edges 63—63 of the vertical side walls 17—17 on the bale chamber 16, FIG. 3, are spaced forwardly and inwardly from the front edges 64—64 of the vertical side walls 28—28 at the opposite sides of the bale receiving chamber 27. This arrangement is necessary in order to permit the bale receiving chamber 27 to shift with the bale thrower 25 from side to side, for example as shown in FIG. 4. It will be understood that at one side the distance between the rear edges 63 and 64 is increased while at the other side the distance therebetween is decreased. In order to guide the bale so that it will have a smooth transition from the bale chamber 16 into the bale receiving chamber 27 guide plates 67—67 are provided. At their forward ends they are mounted on hinges 68—68. One portion of each of the hinges 68—68 is welded at 69—69 to the respective guide plates 67 while the other portion of each of the hinges 68—68 is secured by rivets 70—70 to a strap 71 which extends vertically along the rear edge 63 of each of the vertical side walls 17. The guide plates 67—67 have distal portions 72—72 which extend well into the bale receiving chamber 27 to overlie the vertical side walls 28—28 thereof and function to guide the bale from the bale chamber 16 into the bale receiving chamber 27 regardless of the angular position of the latter with respect to the former.

The present invention is directed particularly to the manner in which the wagon guide arm 26 is constructed and attached at its forward end to the bale thrower 25. As shown in FIGS. 3 and 4 the wagon guide arm 26 includes a rear guide rod 79 from which a yoke 80 depends into overlying relation with respect to the tongue 21 of the wagon 22. The rear guide rod 79 is connected by a relatively heavy coil spring 81 to the rear end of a forward guide arm 82 that extends through a suitable opening in an upstanding flange 83 on a guide arm plate 84 and is connected thereto by a bolt 85. The connection from the forward end of the forward guide arm 82 to the guide arm plate 84 can be varied as the result of the provision of a series of holes 86 through which the bolt 85 can be positioned so as to permit some latitude in its angular position with respect to the guide arm plate 84.

The guide arm plate 84 is secured at its forward end by bolts 87 to a shaft 88 which extends transversely through the vertical side walls 28—28 of the bale thrower 25 and is rotatable with respect thereto about a horizontal axis.

As shown in FIG. 2 the heavy coil spring 81 is bowed downwardly slightly for the purpose of maintaining the yoke 80 in engagement with the tongue 21 of the wagon 22. This action is particularly important when the equipment moves over uneven ground and particularly in those situations where the hay baler 12 is moving downwardly along a slope while the wagon 22 is moving upwardly along the opposite side of the slope. It is desirable that a simple and readily accessible means be provided for adjusting the tension of the heavy coil spring 81 in order to accommodate the terrain that is likely to be encountered.

For this purpose provision is made for adjusting the angular position of the shaft 88 and thereby the angular position of the guide arm plate 84 to the end that the position of the forward guide arm 82 is adjusted to apply the desired tension to the heavy coil spring 81. This is accomplished in accordance with the present invention through the provision of an angular adjusting bracket 89 that may be mounted on one side of the guide arm plate 84. FIGS. 5 and 6 show the details of construction of the angular adjusting bracket 89 at a larger scale. It will be observed that it includes a bottom flange 90 which overlies the upper surface of the guide arm plate 84 and which has elongated openings 91 to permit adjustment with respect to bolts 92 which extend upwardly through the guide arm plate 84. The bracket 89 also includes an upstanding flange 93 which has an inclined upper edge 94 that is arranged to engage a stop 95 which extends laterally from the lower rear portion of the adjacent vertical side wall 28 of the bale receiving chamber 27. It will be understood that the adjusting bracket 89 can be positioned relative to the guide arm plate 84 when the bolts 92 are loosened to the extent that is permitted by the elongated openings or slots 91 in the bottom flange 90. The further forward that the bracket 89 is positioned the greater will be the depression of the guide arm plate 84 and of the forward guide arm 82 with the result that the tension of the coil spring 81 will be correspondingly increased.

If the wagon 22 is not pulled directly behind the bale chamber 16, it is offset therefrom and usually to the right side. It is for this reason that the series of openings or holes 86 is provided in the guide arm plate 84 for permitting some adjustment of the forward end of the forward guide arm 82 in order to angle the bale thrower 25 toward the center line of the wagon 22 when it is offset as described. The adjustment here is made to the end that the bale 31, FIG. 1, as thrown from the bale thrower 25 will have a trajectory intermediate the opposite sides of the body 23 in order to insure that the bales are thrown accurately and do not fall at a location outside of the body 23.

In some arrangements the wagon hitch tube 19, instead of being located to one side of the bale chamber 16, as shown in FIG. 3, for example, may be located along the vertical center line of the bale chamber 16. For such an arrangement the guide arm plate 84, without the angular adjusting bracket 89, is shifted to a position along the shaft 88 at a location midway between the side walls 28—28 of the bale receiving chamber 27. For such modified construction the angular adjusting bracket 89 is mounted on a plate which may be a duplicate of the guide arm plate 84 or it may be somewhat smaller since it is unnecessary to provide for attachment of the forward end of the guide arm 82.

In the modified construction the adjusting bracket 89 cooperates with the stop 95 to adjustably position the shaft 88 and thereby the angular position of the forward guide arm 82 in the manner described above to effect a corresponding change in the tension of the heavy coil spring 81.

It will be understood that certain changes in detail may be made without departing from the scope of the invention as set forth in the appended claims.

What is claimed as new is:

1. In apparatus for baling hay and the like comprising: baling means arranged and adapted to be transported in a forward direction, to compress hay into a bale and to move the same rearwardly into a bale chamber; a bale thrower pivotally supported on said bale chamber rearwardly thereof to rotate about a vertical axis and arranged and adapted to convey a bale received from said bale chamber and throw it into a following wagon having articulate connection to said baling means through a tongue on the former; and a wagon guide arm having a detachable connection at its rear end to said tongue, an intermediate resilient section and a forward section connected to said bale thrower for causing it to pivot in accordance with the position of said wagon; the improvement which comprises means for variably positioning said forward section of said wagon guide arm relative to said bale thrower to effect a corresponding change in the downward force exerted by said intermediate resilient section on said tongue to accommodate different terrain conditions.

2. The invention, as set forth in claim 1, wherein the forward section of the guide arm is secured to a guide arm plate carried by a shaft extending transversely of and rotatably mounted on the bale thrower and the means for variably positioning said forward section of said guide arm reacts between said shaft and said bale thrower.

3. The invention, as set forth in claim 2, wherein the means for variably positioning the forward section of the guide arm includes a bracket secured to the shaft for movement therewith, said bracket having an inclined surface and being movable transversely of said shaft relative to a stop extending laterally from the bale thrower into engagement with said inclined surface.

4. The invention, as set forth in claim 3, wherein the bracket is of angle shape with one flange adjustably mounted on the guide arm plate and an upstanding flange having the inclined surface along its upper edge and engaging the stop extending outwardly from a side wall of the bale thrower.

No references cited.